(12) United States Patent
Kruschwitz et al.

(10) Patent No.: US 6,479,811 B1
(45) Date of Patent: Nov. 12, 2002

(54) METHOD AND SYSTEM FOR CALIBRATING A DIFFRACTIVE GRATING MODULATOR

(75) Inventors: Brian E. Kruschwitz, Rochester, NY (US); John C. Brazas, Hilton, NY (US); Marek W. Kowarz, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/519,227

(22) Filed: Mar. 6, 2000

(51) Int. Cl.[7] .................................................. H01J 3/14
(52) U.S. Cl. .............................. 250/237 G; 250/237 R; 359/573
(58) Field of Search ........................ 250/237 R, 237 G; 359/573

(56) References Cited

U.S. PATENT DOCUMENTS

| | | | |
|---|---|---|---|
| 4,011,009 A | | 3/1977 | Lama et al. |
| 4,281,904 A | | 8/1981 | Sprague et al. |
| 4,367,926 A | | 1/1983 | Hohki |
| 4,389,659 A | | 6/1983 | Sprague |
| 4,656,347 A | * | 4/1987 | Une et al. .................... 250/548 |
| 4,664,524 A | * | 5/1987 | Hattori et al. ............... 356/401 |
| 4,729,640 A | | 3/1988 | Sakata |
| 4,822,146 A | | 4/1989 | Yamanobe et al. |
| 4,850,681 A | | 7/1989 | Yamanobe et al. |
| 4,928,284 A | | 5/1990 | Burns |
| 5,032,906 A | | 7/1991 | Um |
| 5,115,344 A | | 5/1992 | Jaskie |
| 5,222,071 A | | 6/1993 | Pezeshki et al. |
| 5,237,435 A | | 8/1993 | Kurematsu et al. |
| 5,311,360 A | | 5/1994 | Bloom et al. |
| 5,459,610 A | | 10/1995 | Bloom et al. |
| 5,661,592 A | | 8/1997 | Bornstein et al. |
| 5,677,783 A | | 10/1997 | Bloom et al. |
| 5,764,280 A | | 6/1998 | Bloom et al. |
| 5,828,061 A | * | 10/1998 | Kakimoto ............... 250/237 G |
| 5,841,579 A | | 11/1998 | Bloom et al. |
| 5,842,088 A | | 11/1998 | Thompson |

OTHER PUBLICATIONS

Corrigan et al., "Calibration of a Scanned Linear Grating Light Valve Projection System," *SID 99 Digest*, pp. 220–223.

\* cited by examiner

Primary Examiner—Stephone Allen
Assistant Examiner—Eric J Spears
(74) Attorney, Agent, or Firm—Stephen H. Shaw (57) ABSTRACT

A diffractive grating modulator system, includes: a diffractive grating modulator active to produce a plurality of output orders of diffraction; an illumination source for directing light onto the diffractive grating modulator; an output system arranged to receive one of the orders of diffraction from the diffractive grating modulator; a detector arranged to receive a different one of the orders of diffraction from the diffractive grating and to produce a signal representing the output of the diffractive grating modulator; an electronic driving system responsive to a data stream for operating the diffractive grating modulator; and a feedback system connected to the detector and the electronic driving system and responsive to the signal for calibrating the diffractive grating modulator.

20 Claims, 7 Drawing Sheets

METHOD AND SYSTEM FOR CALIBRATING A DIFFRACTIVE GRATING MODULATOR

FIELD OF THE INVENTION

The invention relates to a method and system for calibrating a diffractive grating modulator. In particular it relates to systems that have the output system either in one of the first orders of diffraction or in the $0^{th}$ order. The invention also relates to a method for calibrating the system either prior to the application of a data stream or during the application of a data stream.

BACKGROUND OF THE INVENTION

Diffractive grating modulators are well known in the patent literature. A diffractive spatial light modulator formed in an electro-optic material was disclosed in U.S. Pat. No. 4,281,904, issued Aug. 4, 1981 to Sprague et al., entitled "TIR Electro-Optic Modulator with Individually Addressed Electrodes." Liquid crystal diffractive modulators have been disclosed in U.S. Pat. No. 4,729,640, issued Mar. 8, 1988 to H. Sakata, entitled "Liquid Crystal Light Modulation Device"; U.S. Pat. No. 4,822,146, issued Apr. 18, 1989 to Yamanobe et al., entitled "Optical Modulation Element"; and U.S. Pat. No. 4,850,681, issued Jul. 25, 1989 to Yamanobe et al., entitled "Optical Modulation Device" These modulators all operated with the light transmitting through the device.

Reflective diffraction grating modulators have also been disclosed in U.S. Pat. No. 4,011,009 issued Mar. 8, 1977 to Lama et al., entitled "Reflection Diffraction Grating Having a Controllable Blaze Angle," U.S. Pat. No. 5,115,344 issued May 19, 1992 to J. Jaskie, entitled "Tunable Diffraction Grating," and U.S. Pat. No. 5,222,071 issued Jun. 22, 1993 to Pezeshki et al., entitled "Dynamic Optical Grating Device." More recently, Bloom et al described an apparatus and method of fabrication for a device for optical beam modulation, known to one skilled in the art as a grating-light valve (GLV); see U.S. Pat. No. 5,311,360 issued May 10, 1994 to Bloom et al., entitled "Method and Apparatus for Modulating a Light Beam." This device was later described by Bloom et al with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces. See U.S. Pat. No. 5,459,610 issued Oct. 17, 1995 to Bloom et al., entitled, "Deformable Grating Apparatus for Modulating a Light Beam and Including Means for Obviating Stiction Between Grating Elements and Underlying Substrate." Bloom et al. also presented a method for fabricating the device; see U.S. Pat. No. 5,677,783 issued Oct. 14, 1997 to Bloom et al., entitled, "Method of Making a Deformable Grating Apparatus for Modulating a Light Beam and Including Means for Obviating Stiction Between Grating Elements and Underlying Substrate."

Recently, Bloom et al. have disclosed another form of the grating light valve in U.S. Pat. No. 5,841,579 issued Nov. 24, 1998 to Bloom et al. entitled "Flat Diffraction Grating Light Valve." A method for making this form of the grating light valve is disclosed in U.S. Pat. No. 5,661,592 issued Aug. 26, 1997 to Bornstein et al., entitled, "Method of Making and an Apparatus for a Flat Diffraction Grating Light Valve."

The aforementioned diffractive modulators have been used in various display and printing systems. See U.S. Pat. No. 4,389,659 issued Jun. 21, 1983 to R. Sprague, entitled "Electro-Optic Line Printer"; U.S. Pat. No. 5,237,435 issued Aug. 17, 1993 to Kurematsu et al., entitled "Multicolor Projector Employing Diffraction Grating Type Liquid Crystal Light Modulators"; and U.S. Pat. No. 5,764,280 issued Jun. 9, 1998 to Bloom et al., entitled "Display System Including an Image Generator and Movable Scanner for Same."

Methods for calibration of digital printing and display systems have been disclosed. A system and method for calibrating a Grating Light Valve was published by R. W. Corrigan et al. in "Calibration of a Scanned Linear Grating Light Valve Projection System," SID '99 Digest, pp. 220–223. E. E. Thompson discloses a calibration method for a printing system based on a digital micromirror device (DMD); see U.S. Pat. No. 5,842,088 issued Nov. 24, 1998 to E. Thompson, entitled "Method of Calibrating a Spatial Light Modulator Printing System." This method was utilized to detect and compensate for faulty or stuck pixels. A calibration system for a projection display that uses a correction factor approach was disclosed in U.S. Pat. No. 5,032,906 issued Jul. 16, 1991 to G. Um, entitled "Intensity Calibration Method for Scene Projector."

Intensity stabilization methods utilizing diffractive grating modulators (specifically, acousto-optic modulators (AOM)), have been disclosed in U.S. Pat. No. 4,367,926 issued Jan. 11, 1983 to T. Hohki, entitled "Light Beam Intensity Stabilizing Method," and U.S. Pat. No. 4,928,284 issued May 22, 1990 to D. Burns, entitled "Laser Power Control System." Both of these methods utilized the same diffracted order for both sampling and output, and used the modulation depth of the AOM for intensity control. Because the same diffracted order is used, these methods reduce the power available to be applied to the print medium, thereby having the potential for degrading the performance of the printers. There is a need therefore for an improved calibration system and method that avoids this problem.

SUMMARY OF THE INVENTION

The need is met according to the present invention by providing a diffractive grating modulator system that includes: a diffractive grating modulator active to produce a plurality of output orders of diffraction; an illumination source for directing light onto the diffractive grating modulator; an output system arranged to receive one of the orders of diffraction from the diffractive grating modulator; a detector arranged to receive a different one of the orders of diffraction from the diffractive grating and to produce a signal representing the output of the diffractive grating modulator; an electronic driving system responsive to a data stream for operating the diffractive grating modulator; and a feedback system connected to the detector and the electronic driving system and responsive to the signal for calibrating the diffractive grating modulator.

It is advantageous that the unique properties of a diffractive grating modulator can be useful for calibration of systems employing these types of modulators. Specifically, the symmetry of diffracted orders generated by a binary diffraction grating makes it possible for one order to be used for output and the second for monitoring. Common systems employ a beam splitter in the path of the output beam to sample the output for calibration. This has disadvantages, including a reduction in output power, and a potential for introduction of optical aberrations, both of which are corrected in the present invention.

The invention can be applied to, for example, linear arrays of grating modulator elements used to generate images in printing and projection display applications. The system and method for calibrating can correct for spatial nonuniformities present in the illuminating light beam or in the diffractive grating modulator. Furthermore, temporal variations in the optical power provided by the illumination source can be corrected for using the present invention.

BRIEF DESCRIPTION OF THE DRAWINGS

The subject matter of the invention is described with reference to the embodiments shown in the drawings.

DETAILED DESCRIPTION OF THE INVENTION

Figure 1:
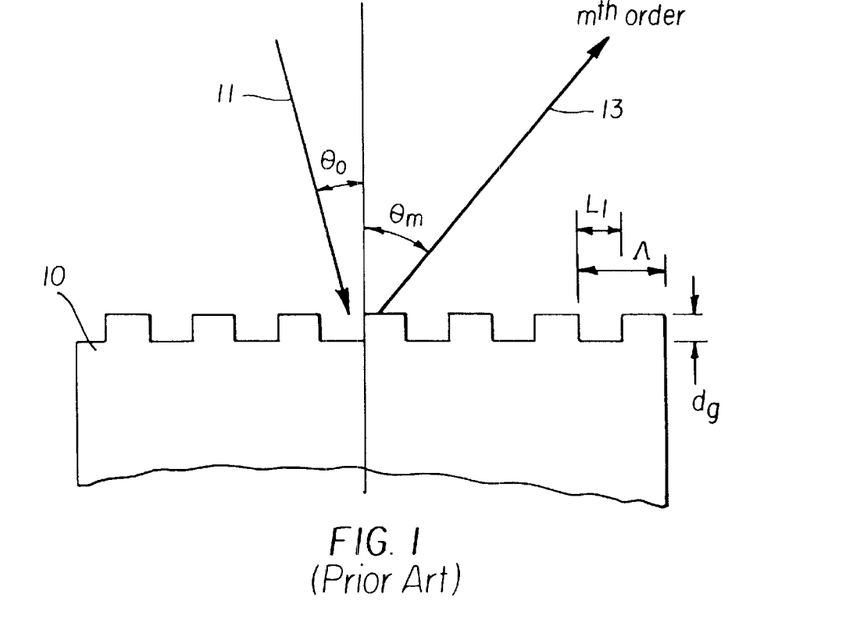
FIG. 1 is an illustration of diffraction from a binary reflective grating.

Periodic corrugations on optical surfaces (i.e. diffraction gratings) are well known to perturb the directionality of incident light. Collimated light incident in air upon a grating is diffracted into a number of different orders, as described by the grating equation:

$$\sin\theta_m = \sin\theta_0 + \frac{m\lambda}{\Lambda}, \quad \text{Eq. (1)}$$

where $\lambda$ is the wavelength of the light and m is an integer denoting the diffracted order. FIG. 1 illustrates a reflective grating 10 having an optical beam 11 incident on the grating 10 at an angle $\theta_0$. The grating surface is defined to have a period $\Lambda$, which defines the diffraction angles according to Equation 1. A diffracted beam 13 corresponding to diffraction order m exits the grating 10 at an angle $\theta_m$.

The diffraction grating 10 pictured in FIG. 1 is a binary grating where the grating profile is a square wave with an optical grating depth $d_g$. The duty cycle is defined as the ratio of the width of the groove $L_1$ to the grating period $\Lambda$. A binary phase grating will have the maximum diffraction efficiency when the duty cycle is equal to 0.5 and R, the reflectivity, is equal to 1.0.

For uniform reflectivity and 0.5 duty cycle, Equation 2 gives the theoretical diffraction efficiency, within the accuracy of scalar diffraction theory.

$$\eta_m = R\cos^2\left(\frac{\pi}{\lambda}(q_m d_g - m\lambda/2)\right)\frac{\sin^2(m\pi/2)}{(m\pi/2)^2}, \quad \text{Eq. (2)}$$

where $q_m$ is a geometrical factor, $$q_m = \cos\theta_0 + \cos\theta_m = 1 + \sqrt{1 - (m\lambda/\Lambda)^2} \quad \text{Eq. (3)}$$

for normal incidence ($\theta_0=0$). Eq.(3)

According to Equations 2 and 3, the optical powers diffracted into two separate orders from a region of the diffraction grating 10 are simple functions of the local intensity of illumination, the reflectivity, and the local diffraction grating characteristics. For example, light from two diffracted orders can be passed through separate optical systems that image the diffraction grating 10 (here assumed to be spatially uniform $\Lambda$ and $d_g$). According to equations 2 and 3, the observed spatial distributions of light in the image planes of both imaging systems will have the same profile, differing only by a constant factor of the diffraction efficiencies.

When the diffraction grating 10 is illuminated from normal incidence, it diffracts light with equal efficiency into anti-symmetric orders. For example, the maximum efficiency in the first (m=1) order occurs when the optical grating depth $d_g$ is equal to $\lambda/4$. Such a grating has equal diffraction efficiencies into the +1 and −1 orders of up to 40% for the gratings of interest ($\lambda/\Lambda \leq 0.5$), while the remaining light is diffracted into higher odd orders (i.e. ±3, ±5, etc.). If the light beams from two anti-symmetric orders (e.g. the +1 and −1 orders) are passed through the aforementioned imaging systems, the observed spatial profiles will be identical, even in the presence of spatial nonuniformities in the grating characteristics $\Lambda$ and $d_g$.

Figure 2:
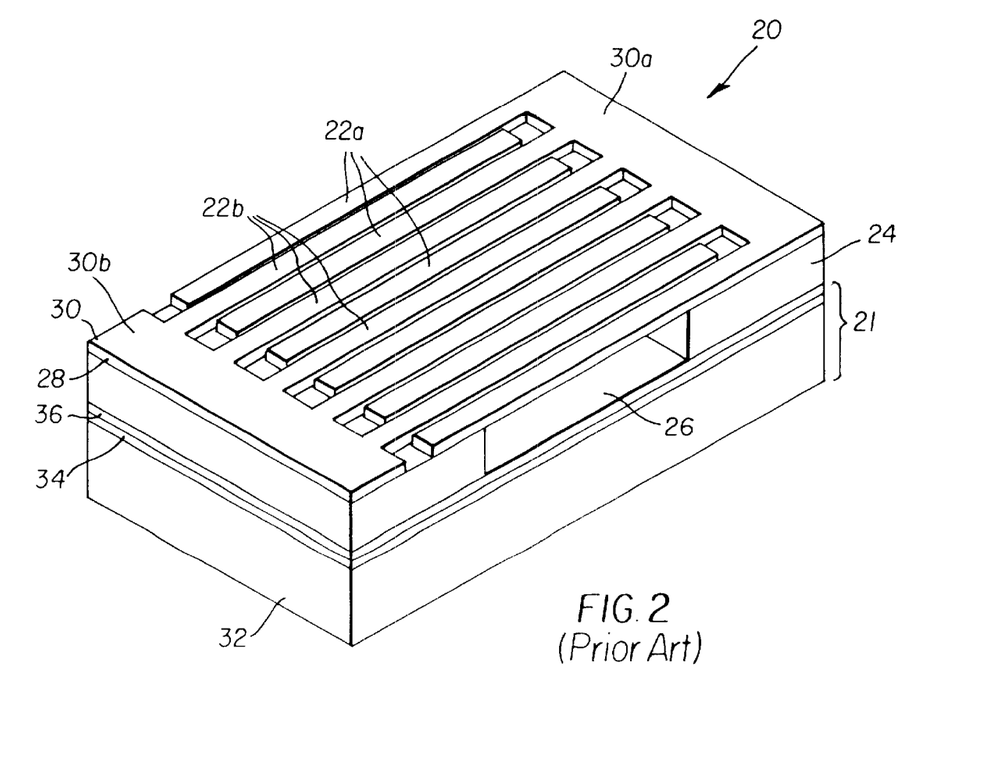
FIG. 2 is a perspective, partially cut-away view of an electro-mechanical grating device.

FIG. 2 is a perspective, partially cut-away view of an electro-mechanical grating device 20 that uses the principles of grating diffraction for the modulation of a light beam. The electromechanical grating device 20 comprises a first and a second set of deformable ribbon elements 22a and 22b that are formed atop a spacer layer 24 in which a channel 26 is formed. The deformable ribbon elements comprise a ribbon layer 28, which has an intrinsic tensile stress, and a reflective, conductive layer 30. The reflective, conductive layer 30 is patterned to form a first and a second conductive region 30a and 30b. The ribbon layer 28 is patterned according to the first and second conductive regions 30a and 30b to form the first and second set of deformable ribbon elements 22a and 22b. According to the patterning, every other ribbon element suspended over the channel 26 belongs to the same set. The first and second conductive region 30a and 30b perform the dual purposes of enhancing the diffraction efficiency by increasing the reflectivity, and providing a means of applying a voltage to either the first or second set of deformable ribbon elements 22a or 22b.

The electromechanical grating device 20 comprises a base 21. The base 21 comprises a substrate 32, which is chosen from the materials of silicon, another semiconductor, glass, metal, or plastic. Atop the substrate 32, a bottom conductive layer 34 is provided. The material for the bottom conductive layer 34 is chosen from the group consisting of aluminum, titanium, gold, silver, tungsten, silicon alloys, and indium tin oxide. The bottom conductive layer 34 provides a means of applying a voltage to the substrate. A protective layer 36 is provided between the bottom conductive layer 34 and the spacer layer 24.

Figure 3:
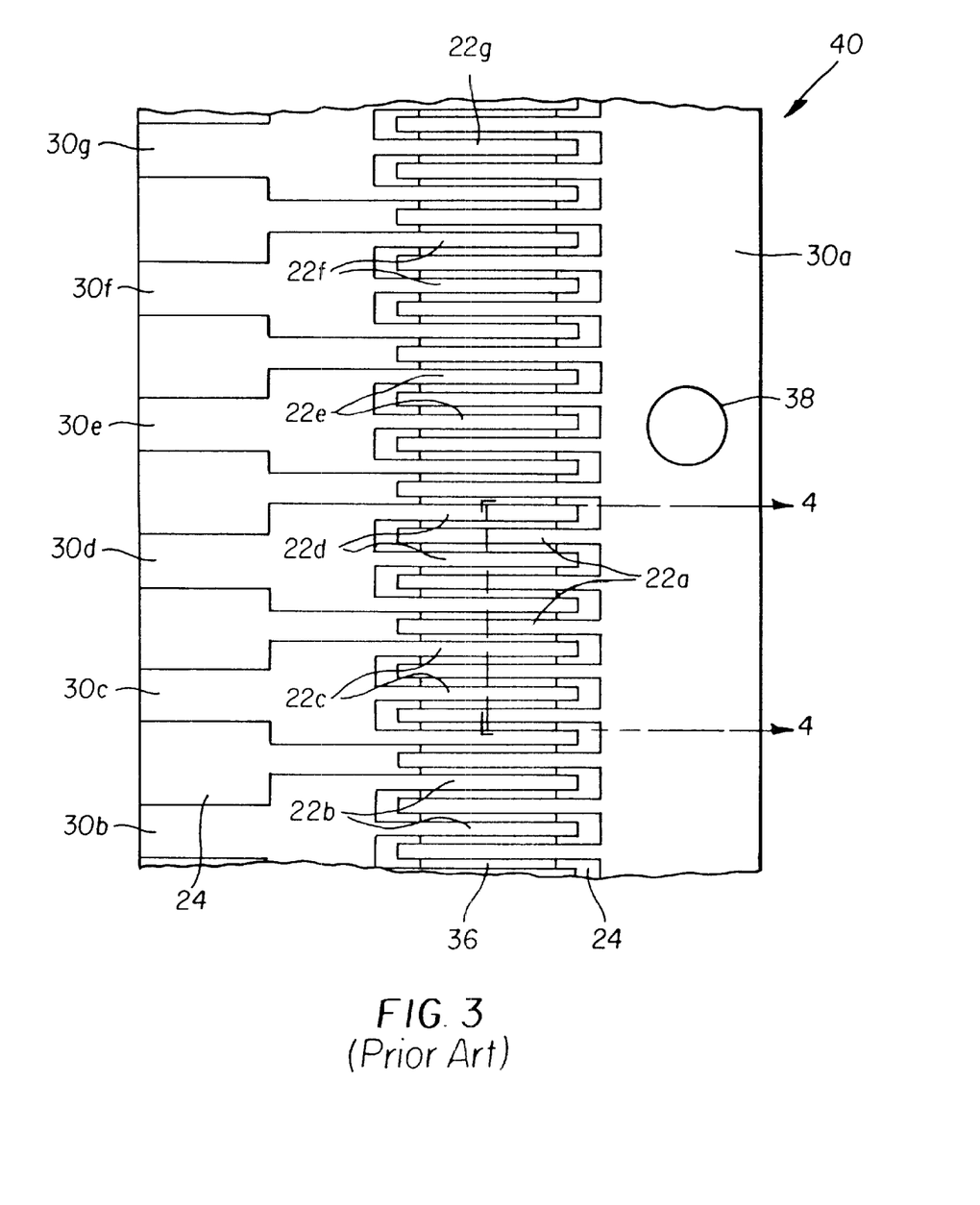
FIG. 3 is a top view of a linear electromechanical grating modulator array.

FIG. 3 is a top view of a linear electromechanical grating modulator array 40 that is produced by forming a linear series of the electro-mechanical grating devices. A view plane 4—4, parallel to the length of the linear electromechanical grating modulator array 40, provides a cross-sectional view of an electromechanical grating modulator as shown in FIGS. 4 and 5.

The conductive, reflective layer is patterned to form a first conducting region 30a, which provides a common potential to alternate ribbon elements along the entire length of the linear electromechanical grating modulator array 40. The patterning also forms a series of conductive regions in order to provide voltages to alternate ribbons of each individual element (pixel) of the linear electromechanical grating modulator array. In FIG. 3, which displays six pixels, these are the second, third, fourth, fifth, sixth, and seventh conductive regions 30b, 30c, 30d, 30e, 30f, and 30g. According to the patterning, the ribbon layer is also patterned to form a first, second, third, fourth, fifth, sixth, and seventh set of deformable ribbon elements 22a, 22b, 22c, 22d, 22e, 22f, and 22g.

The first conductive region 30a is electrically connected to the bottom conductive layer 34 through a contact 38. The contact is formed by etching at least one opening through the multilayer that comprises the ribbon layer 28, the spacer layer 24, and the protective layer 36. The opening is filled with a thick conductive layer that is, for example, an aluminum alloy. The thick conductive layer is limited by photolithographic processing and etching methods to a small area enclosing the contact 38. Since the contact 38 maintains the first conductive region 30a on the first set of deformable ribbons 22a at the same potential as the bottom conductive layer 34, these deformable ribbon cannot be electrostatically actuated.

Figure 4:
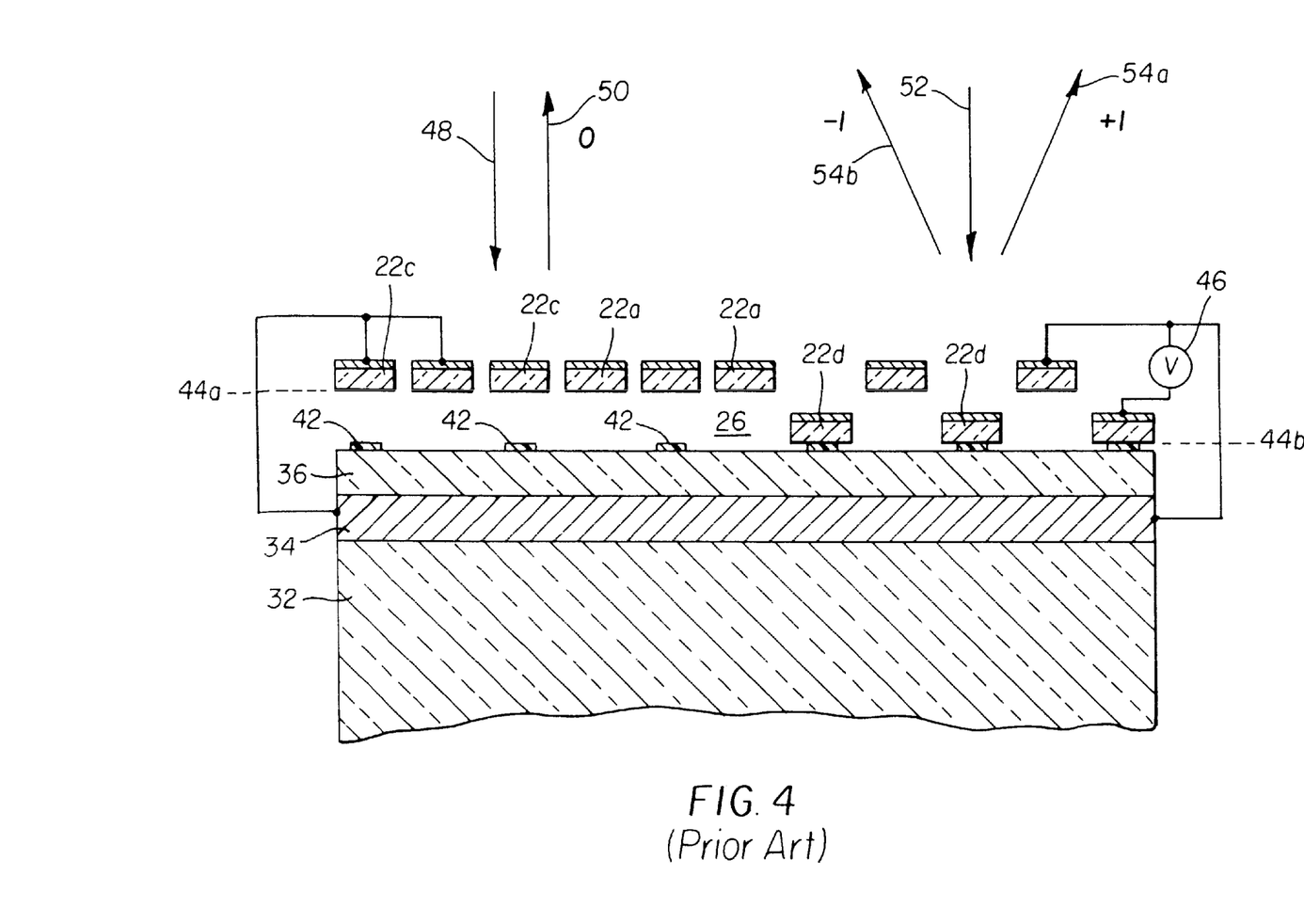
FIG. 4 is a cross-sectional view along plane 4—4 indicated in FIG. 3 of two pixels of the linear electromechanical grating modulator array used for pulse width modulation.
Figure 5:
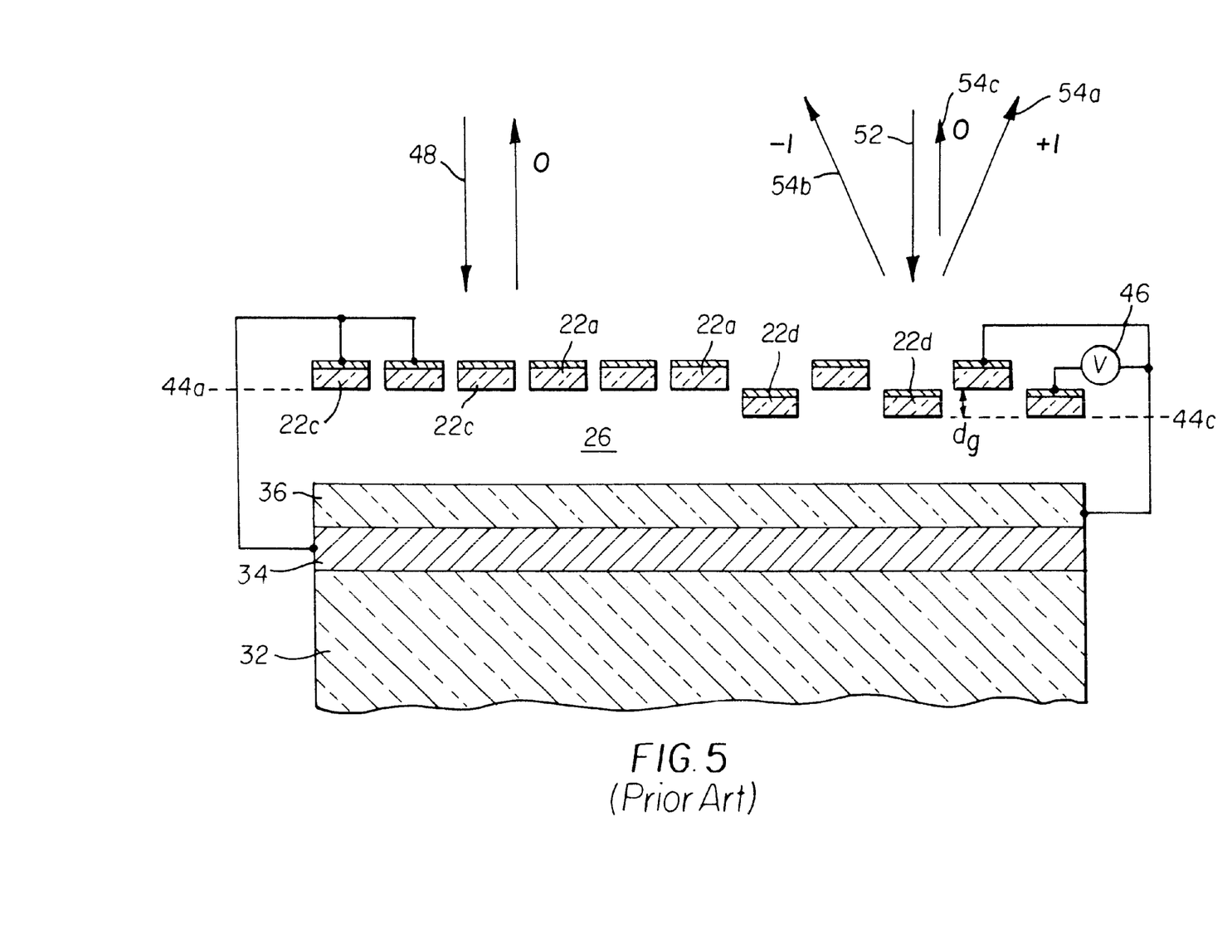
FIG. 5 is a cross-sectional view along plane 4—4 indicated in FIG. 3 of two pixels of the linear electromechanical grating modulator array used for amplitude modulation.

FIG. 4 illustrates the operation of the linear electromechanical grating modulator array 40. FIG. 4 is a cross-section of the device along view plane 4—4 indicated in FIG. 3 of two pixels. The two pixels that are displayed are defined by the third and fourth conductive regions 30c and 30d, which are associated with the third and fourth sets of deformable ribbon elements 22c and 22d.

The configuration illustrated in FIG. 4 has no voltage applied to the third conductive region 30c with respect to the bottom conductive layer 34. Hence, there is no electrostatic force to deflect the members of the third set of deformable ribbon elements 22c. The surfaces of the first and third sets of deformable ribbon elements 22a and 22c that oppose the substrate 32 are coplanar, and define an undeflected ribbon surface 44a. Furthermore, due to the planar structure of the device, the top surfaces of the first and third sets of deformable ribbon elements 22a and 22c form a coplanar, mirror-like surface. An incident light beam 48 will be substantially reflected into a $0^{th}$ order reflected light beam 50.

A voltage source 46 applies a voltage to the fourth conductive region 30d with respect to the bottom conductive layer 34. The potential difference produces an attractive electrostatic actuation force that results in the deflection of the centers of the members of the fourth set of deformable ribbon elements 22d toward the substrate 32. The voltage applied by the voltage source 46 is sufficient to pull the members of the fourth set of deformable ribbon elements downward until a mechanical stop is encountered. The linear electro-mechanical grating modulator array 40 illustrated in FIG. 4 is provided with a series of standoffs 42, which take the form of pedestals or lines atop the protective layer 36, and below every deformable ribbon element not associated with the first set 22a. The standoffs define a stop surface 44b. The standoffs 42 serve to decrease the contact surface area when the deformable ribbon elements are completely actuated, as illustrated by the fourth set of deformable ribbon elements in FIG. 4. The reduced surface area lowers the risk of device failure from stiction forces, which can cause the deformable ribbon elements to remain in contact with the substrate even when the voltage source 46 is removed.

Because the first and fourth sets of deformable ribbon elements 22a and 22d are interdigitated and are located at different heights in the channel 26, a diffraction grating is formed in this region of the linear electromechanical grating modulator array 40. An incident light beam 52 illuminates the pixel from normal incidence. The separation of surfaces 44a and 44b is an odd multiple of $\lambda/4$, which, from equations 2 and 3, yields the maximum diffraction efficiency into the first order, and no reflection. Hence, the incident light beam 52 is substantially diffracted with equal efficiency into a +1 order diffracted beam 54a and a −1 order diffracted beam 54b, with no reflection into the $0^{th}$ order.

The linear electromechanical grating modulator array 40, as illustrated in FIG. 4, can be used to encode information through pulse width modulation (PWM). Using this technique, each pixel in the linear array is dynamically switched between the two states discussed above, and one of the diffracted orders is collected and directed to an output system. One of the states is then a "bright" state, and the other a "dark" state. Data can be encoded with a pixel of the linear modulator array 40 by controlling the length of time the bright state is produced, or by controlling the total amount of time the pixel is in the bright state during a given integration period.

FIG. 5 is a cross-section of the linear electromechanical grating modulator array 40 along view plane 4—4 indicated in FIG. 3 illustrating a device using an amplitude modulation scheme. The two pixels that are displayed are defined by the third and fourth conductive regions 30c and 30d, which are associated with the third and fourth sets of deformable ribbon elements 22c and 22d.

Similar to the configuration illustrated in FIG. 4, no voltage is applied to the third conductive region 30c with respect to the bottom conductive layer 34 in FIG. 5. The surfaces of the first and third sets of deformable ribbon elements 22a and 22c that oppose the substrate 32 are coplanar, and define an undeflected ribbon surface 44a. An incident light beam 48 will be substantially reflected into a zeroth order reflected light beam 50a.

A voltage source 46 applies a voltage to the fourth conductive region 30d with respect to the bottom conductive layer 34. The potential difference produces an attractive electrostatic actuation force that results in the deflection of the centers of the members of the fourth set of deformable ribbon elements 22d toward the substrate 32. The surfaces of the fourth set of deformable ribbon elements 22d that opposes the substrate 32 define a deflected ribbon surface 44c. The alternating undeflected and deflected ribbon elements form a diffraction grating with an optical grating depth $d_g$ equal to the separation of surfaces 44a and 44c.

An incident light beam 52 that illuminates the pixel defined by the fourth set of deformable ribbon elements 22d from normal incidence will be substantially diffracted into a +1 order diffracted beam 54a, a −1 order diffracted beam 54b, and a $0^{th}$ order reflected beam 54c. A first order diffraction efficiency, $\eta_1$, determines the diffraction into the +1 order beam 54*a* and the −1 order beam 54*b*, which will be equal. A $0^{th}$ order diffraction efficiency $\eta_0$, determines the diffraction into the $0^{th}$ order reflected beam 54*c*. Both diffraction efficiencies can be predicted using equations 2 and 3, and are dependent on the optical grating depth $d_g$. Hence, $\eta_1$ increases continuously from zero when the fourth set of deformable ribbon elements 22*d* are undeflected to a maximum value when the ribbon elements are deflected to form a diffraction grating with $d_g$ equal to $\lambda/4$. Conversely, $\eta_0$ decreases continuously from a maximum value when the fourth set of deformable ribbon elements 22*d* are undeflected to zero when the ribbon elements are deflected to form a diffraction grating with $d_g$ equal to $\theta/4$.

The linear electro-mechanical grating modulator array 40, as illustrated in FIG. 5, can be used to encode information through amplitude modulation (AM). Using this technique, each pixel in the linear electro-mechanical grating modulator array 40 forms a diffraction grating with a variable diffraction efficiency, and one of the diffracted orders is collected and directed to an output system. Data can be encoded with a pixel of the linear modulator array 40 by controlling the diffraction efficiency of the grating within that pixel.

Figure 6:
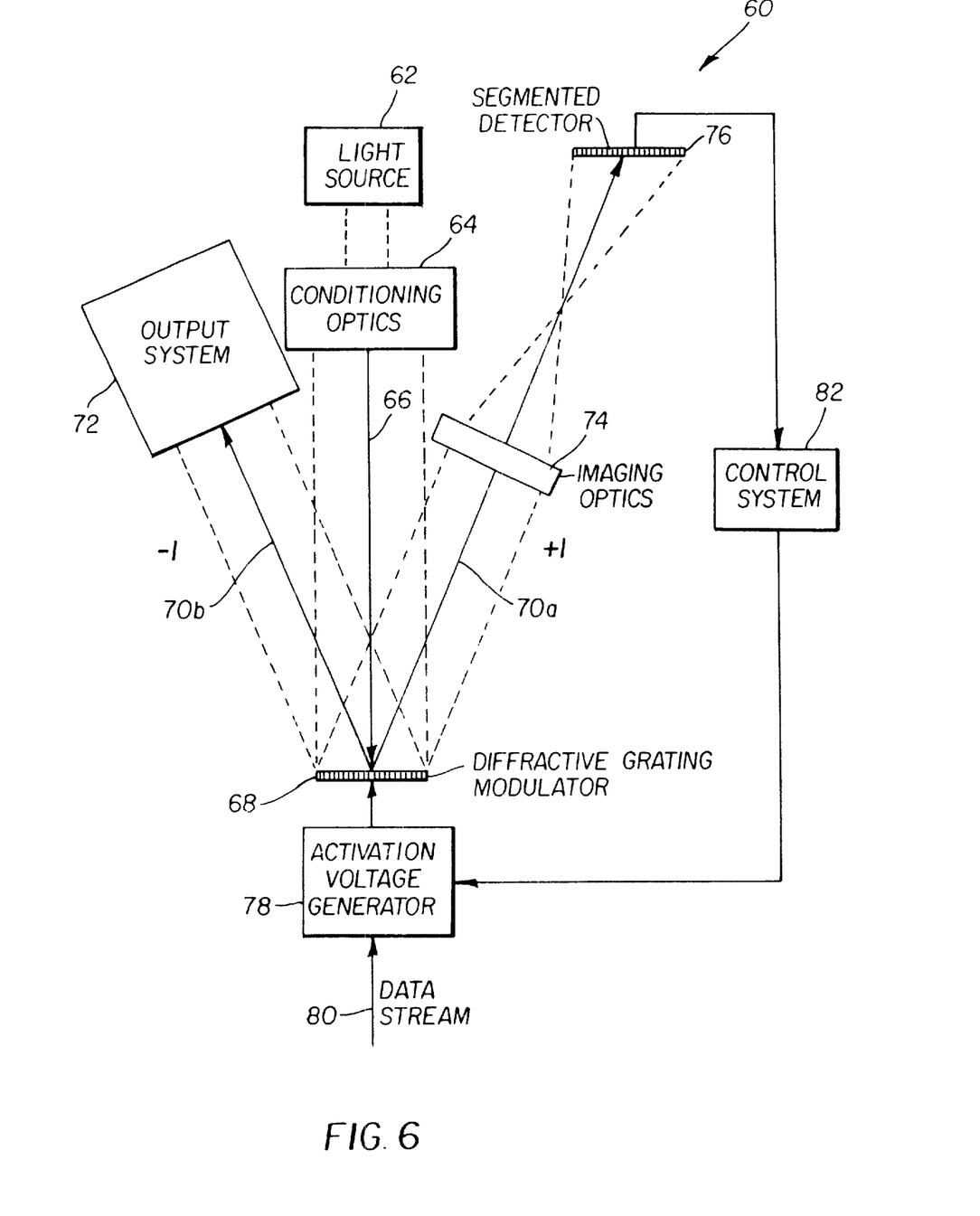
FIG. 6 is a diagram of a system that delivers modulated light to a non-zero diffracted order of a diffractive grating modulator, and includes a calibration system according to one embodiment of the present invention.

FIG. 6 is a diagram of a light modulation system 60 that delivers modulated light to a non-zero diffracted order of a diffractive grating modulator 68, and includes a calibration system according to the present invention. A light source 62, providing light with the desired wavelength and brightness characteristics, illuminates a set of conditioning optics 64. The light exiting the conditioning optics 64 produces an illumination beam 66 with the desired properties that illuminates the diffractive grating modulator 68. The diffractive grating modulator 68 may be an electromechanical grating device or a linear electromechanical grating modulator array 40, such as those described above, or any other type of diffractive grating modulator, such as devices formed from liquid crystals, acousto-optic materials, electro-optic materials, or semiconductor quantum wells.

The light exits the diffractive grating modulator 68 via its various diffracted orders. Those pixels for which the grating has been activated will diffract light predominantly into a +1 order diffracted beam 70*a* and a −1 order diffracted beam 70*b*. The −1 order diffracted beam 70*b* is collected by the output system 72, which may be, for example, a projection lens system and screen for a display or an imaging lens system and photosensitive media for a printer. The +1 order diffracted beam 70*a* is collected by imaging optics 74, which images the diffractive grating modulator 68 onto a segmented detector 76. The segmented detector can take the form of multiple photodiodes, a segmented photodiode, or a CCD array. The magnification of the imaging system produces an image of each pixel of the diffractive grating modulator 68 that covers one or more segments of the segmented detector 76. Therefore, the segmented detector 76 can be used to monitor the intensity of the light diffracted from each pixel of the diffractive grating modulator 68 into the +1 order diffracted beam 70*a*. Due to the symmetry of the diffraction outlined above, the −1 order diffracted beam 70*b* will receive the same diffracted intensity.

The activation of the grating elements in the diffractive grating modulator 68 is accomplished using an activation voltage generator 78. The activation voltage generator 78 receives inputs from a data stream 80, which contains the data to be encoded into the modulation of the light, and a control system 82, which provides a series of correction factors. As a result of a correction factor, the length of a pulse that is sent to a pixel is altered for PWM encoding, or the activation voltage level that is sent to a pixel is altered for AM encoding. The control system 82 is placed in a feedback loop, taking its input from the segmented detector 76, and providing the correction factors to the activation voltage generator 78. These correction factors are produced based on the intensity data received from the segmented detector 76, and are generated in order to provide spatially uniform diffracted intensity profile or constant output power, or a combination of both.

Although the system illustrated in FIG. 6 utilizes the +1 and −1 orders, it will be apparent to one skilled in the art that any two non-zero diffracted orders can be used. For normal incidence illumination, the system would be best utilized with two antisymmetric orders, +m and −m.

Figure 7:
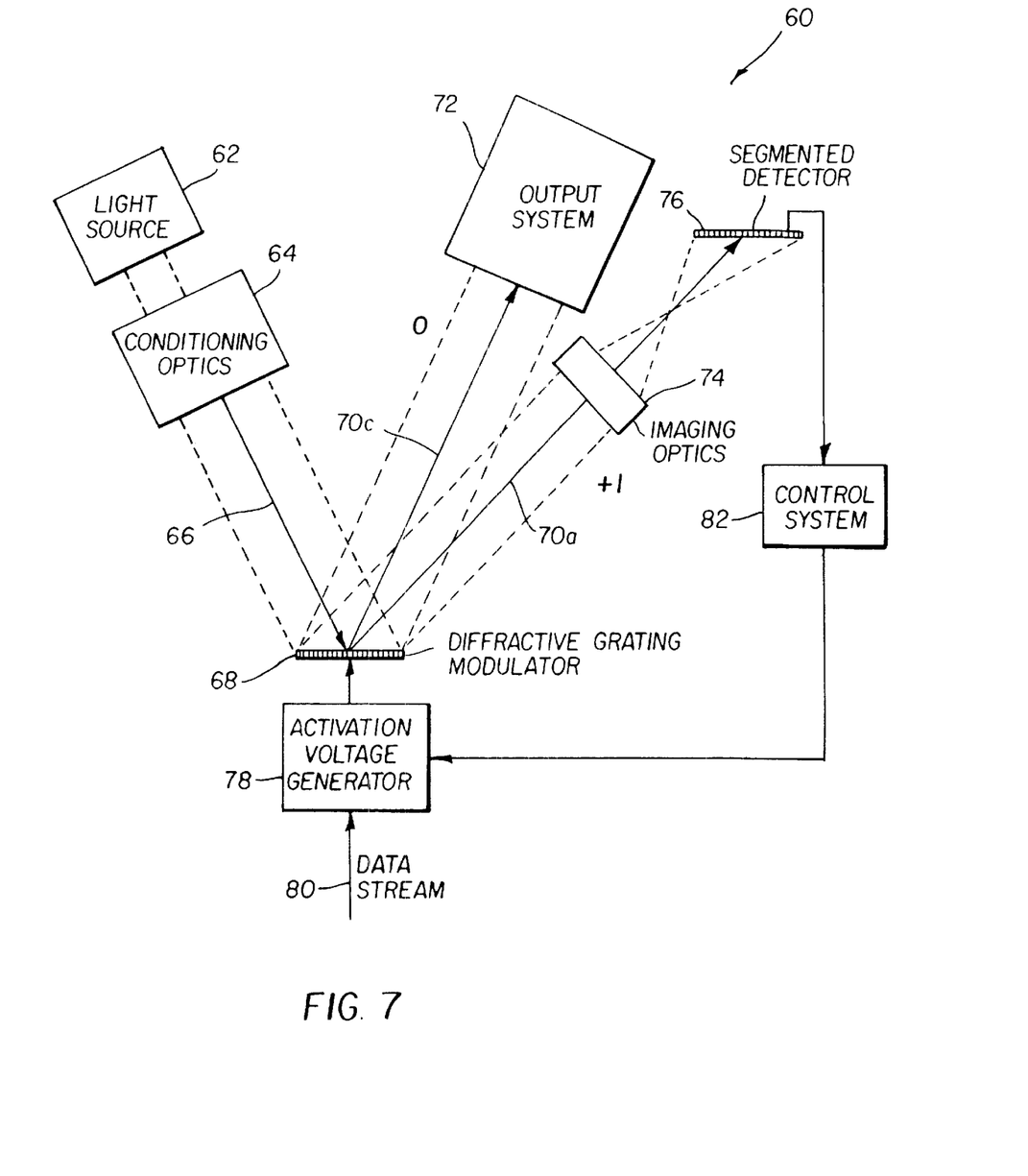
FIG. 7 is a diagram of a system that delivers modulated light to the zeroth order of a diffractive grating modulator, and includes a calibration system according to an alternative embodiment of the present invention.

FIG. 7 is a diagram of a light modulation system 60 that delivers modulated light to the $0^{th}$ diffracted order of a diffractive grating modulator, and includes a calibration system according to an alternative embodiment of the present invention. Such a system might be preferable to the system illustrated in FIG. 6 for many applications that require high efficiency due to the higher diffraction efficiency into the $0^{th}$ order than into the +1 or −1 order. A light source 62, providing light with the desired wavelength and brightness characteristics, illuminates a set of conditioning optics 64. The light exiting the conditioning optics 64 produces an illumination beam 66 with the desired properties that illuminates the diffractive grating modulator 68.

The light exits the diffractive grating modulator 68 via its various diffracted orders. The $0^{th}$ order reflected beam 70*c* is collected by the output system 72. The +1 order diffracted beam 70*a* is collected by imaging optics 74, which images the diffractive grating modulator 66 onto a segmented detector 76. The magnification of the imaging system produces an image of each pixel of the diffractive grating modulator that covers one or more segments of the segmented detector 76. Therefore, the segmented detector can be used to monitor the intensity of the light diffracted from each pixel of the diffractive grating modulator 68 into the +1 order diffracted beam 70*a*. Due to the symmetry of the diffraction outlined above, the light delivered to the output system via the $0^{th}$ order diffracted beam will be a scaled, inverse image of the pixels as measured by the segmented detector 76.

The activation of the grating elements in the diffractive grating modulator 68 is accomplished using an activation voltage generator 78. The activation voltage generator 78 receives inputs from a data stream 80, which contains the data to be encoded into the modulation of the light, and a control system 82, which provides a series of correction factors. The control system 82 is placed in a feedback loop, taking its input from the segmented detector 76, and providing the correction factors to the activation voltage generator 78. These correction factors are produced based on the intensity data received from the segmented detector 76, and are generated in order to provide spatially uniform diffracted intensity profile or constant output power, or a combination of both.

Figure 8:
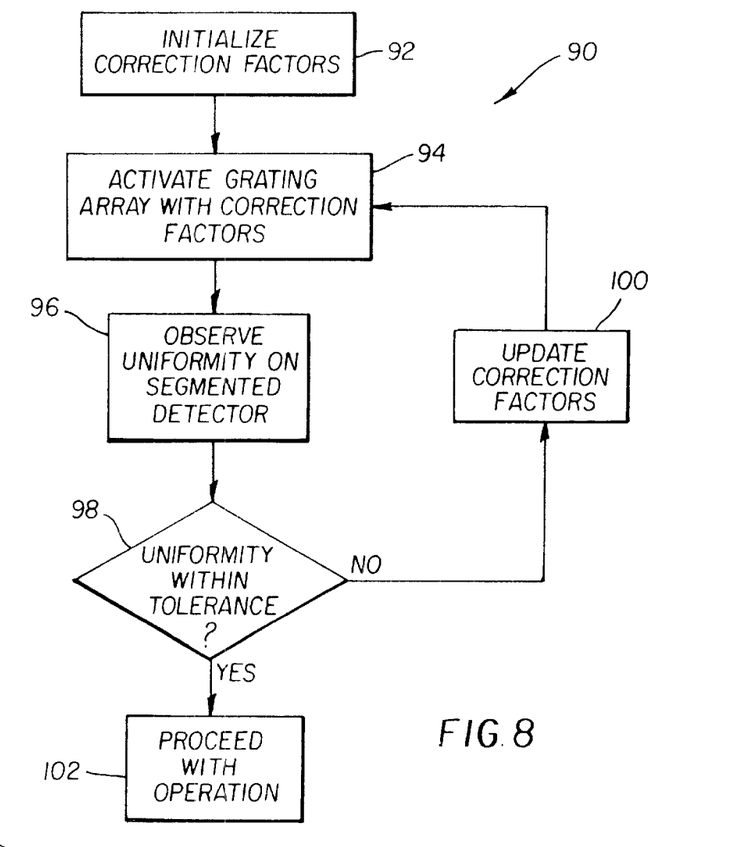
FIG. 8 is a flow chart explaining a method for calibrating a light modulation system according to the present invention that uses a diffractive grating modulator before operation.

A flow chart 90 for a calibration method according to the present invention is shown in FIG. 8. The calibration method is carried out before the operation of a light modulation system that uses a diffractive grating modulator. The calibration method can be applied using the light modulation system 60 illustrated in either FIG. 6 or 7. A first step 92 is to initialize the correction factors that are provided to the activation voltage generator 78. As a second step 94, the diffractive grating modulator 66 is activated in a predetermined pattern. The uniformity and power as measured by the segmented detector 76 are observed in the third step 96. The fourth step 98 tests to see if the uniformity and power are within the required tolerance. If not, a feedback step 100 generates a new set of correction factors to be provided to the activation voltage generator 78. The second through fourth steps 94, 96, and 98, and the feedback step 100 are repeated until the uniformity and intensity are within the specified tolerance. When this occurs, the light modulation system has been calibrated, and the final step 102 initiates the generation of modulated light for the output system 72.

Figure 9:
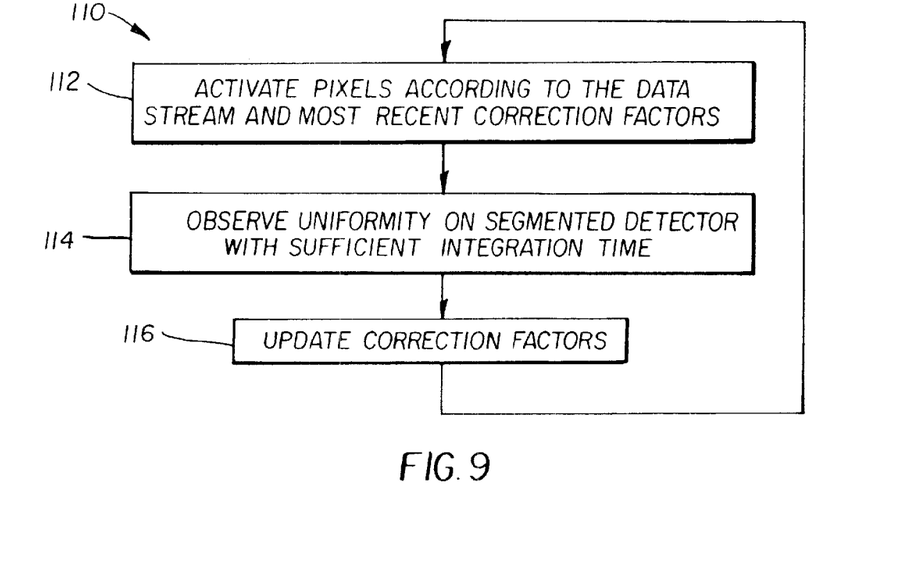
FIG. 9 is a flow chart explaining an alternative embodiment of a method of calibrating a light modulation system that uses a diffractive grating modulator during operation.

A flow chart 110 for a calibration method according to an alternative embodiment of the present invention for use during the operation of a light modulation system is shown in FIG. 9. The calibration method can be applied using the light modulation system 60 illustrated in either FIG. 6 or 7, while the system 60 is providing modulated light to the output system 72. In the first step 112, the pixels of the diffractive grating modulator 68 are activated according to the data stream 80 and the most recent set of correction factors. In the second step 114, the diffracted intensity of each pixel is monitored by the segmented detector 76 and compared to the data applied to that pixel. From this information, an updated correction factor for each pixel is generated by the control system 82 and applied to the activation voltage generator 78, which comprises the final step 116. These steps 112, 114, and 116 are repeated throughout the operation of the light modulation system 60 in order to maintain uniformity and power stability.

The above system and methods have been described in relation to an array of diffractive grating modulators and a segmented detector. It can be easily seen by one skilled in the art that the above system and methods can also be applied to the calibration of a single diffractive grating modulator using a single (i.e. non-segmented) detector. A system of this sort could be used to provide a stable power output or to calibrate an entire array one pixel at a time.

The invention has been described in detail with particular reference to certain preferred embodiments thereof, but it will be understood that variations and modifications can be effected within the spirit and scope of the invention.

PARTS LIST

| | |
|---|---|
| 10 | reflective grating |
| 11 | incident optical beam |
| 13 | diffracted beam |
| 20 | electro-mechanical grating device |
| 21 | base |
| 22a | first set of deformable ribbon elements |
| 22b | second set of deformable ribbon elements |
| 22c | third set of deformable ribbon elements |
| 22d | fourth set of deformable ribbon elements |
| 22e | fifth set of deformable ribbon elements |
| 22f | sixth set of deformable ribbon elements |
| 22g | seventh set of deformable ribbon elements |
| 24 | spacer layer |
| 26 | channel |
| 28 | ribbon layer |
| 30 | reflective, conductive layer |
| 30a | first conductive region |
| 30b | second conductive region |
| 30c | third conductive region |
| 30d | fourth conductive region |
| 30e | fifth conductive region |
| 30f | sixth conductive region |
| 30g | seventh conductive region |
| 32 | substrate |
| 34 | bottom conductive layer |
| 36 | protective layer |
| 38 | contact |
| 40 | linear electro-mechanical grating modulator array |

-continued

PARTS LIST

| | |
|---|---|
| 42 | standoffs |
| 44a | undeflected ribbon surface |
| 44b | stop surface |
| 44c | deflected ribbon surface |
| 46 | voltage source |
| 48 | incident light beam |
| 50 | $0^{th}$ order reflected light beam |
| 52 | incident light beam |
| 54a | +1 order diffracted beam |
| 54b | −1 order diffracted beam |
| 54c | $0^{th}$ order reflected beam |
| 60 | light modulation system |
| 62 | light source |
| 64 | conditioning optics |
| 66 | illumination beam |
| 68 | diffractive grating modulator |
| 70a | +1 order diffracted beam |
| 70b | −1 order diffracted beam |
| 70c | $0^{th}$ order reflected beam |
| 72 | output system |
| 74 | imaging optics |
| 76 | segmented detector |
| 78 | activation voltage generator |
| 80 | data stream |
| 82 | control system |
| 90 | method for calibrating before operation |
| 92 | first step |
| 94 | second step |
| 96 | third step |
| 98 | fourth step |
| 100 | feedback step |
| 102 | final step |
| 110 | method for calibrating during operation |
| 112 | first step |
| 114 | second step |
| 116 | final step |
| $d_g$ | optical grating depth |
| $\eta_m$ | $m^{th}$ order diffraction efficiency |
| $\eta_0$ | zeroth order diffraction efficiency |
| $\eta_1$ | first order diffraction efficiency |
| $\lambda$ | wavelength of light |
| $\Lambda$ | grating period |
| $L_{-1}$ | width of the groove |
| m | diffracted order |
| $\theta_0$ | angle of incidence |
| $\theta_m$ | angle of diffraction order m |
| $q_m$ | geometrical factor |
| R | reflectivity |

What is claimed is:

1. A diffractive grating modulator system, comprising:
   a) a diffractive grating modulator active to produce a plurality of output orders of diffraction;
   b) an illumination source for directing light onto the diffractive grating modulator;
   c) an output system arranged to receive one of the orders of diffraction from the diffractive grating modulator;
   d) a detector arranged to receive a different one of the orders of diffraction from the diffractive grating and to produce a signal representing the output of the diffractive grating modulator;
   e) an electronic driving system responsive to a data stream for operating the diffractive grating modulator; and
   f) a feedback system connected to the detector and the electronic driving system and responsive to the signal for calibrating the diffractive grating modulator.

2. The system as recited in claim 1 wherein the diffractive grating modulator comprises a plurality of individual pixel elements.

3. The system as recited in claim 2 wherein the detector comprises a plurality of discrete segments and includes imaging optics for forming an image of the diffractive grating modulator onto the detector.

4. The system as recited in claim 1 wherein the diffractive grating modulator is an e electromechanical grating device.

5. The system as recited in claim 1 wherein the output system receives the mth order of diffraction and the detector receives the −mth order of diffraction.

6. The system as recited in claim 5 wherein the light from the illumination source is normal to the diffractive grating modulator.

7. The system as recited in claim 1 wherein the output system captures the 0th order and the detector captures a higher diffracted order.

8. The system as recited in claim 1 wherein the data stream contains image data.

9. The system as recited in claim 1 wherein the diffractive grating modulator system produces stable power.

10. The system as recited in claim 1 wherein the output system is a display.

11. The system as recited in claim 1 wherein the output system is a printer.

12. A diffractive grating modulator system having a plurality of pixel elements and being active to produce a plurality of output orders of diffraction, comprising:

a) an illumination source for providing light on the diffractive grating modulator;

b) an output system arranged to receive one order of diffraction from the diffractive grating modulator;

c) a detector having a plurality of discrete segments for detecting another order of diffraction from the diffractive grating modulator and producing a signal representing the output of the diffractive grating modulator;

d) an electronic driving system for operating the diffractive grating modulator; and e) a feedback system connected between the detector and the electronic driving system and responsive to the signal for calibrating the diffractive grating modulator system.

13. The system as recited in claim 12, further comprising an imaging device for producing an image of the diffractive grating modulator onto the detector.

14. The system as recited in claim 12 wherein the diffractive grating modulator is an electromechanical grating device.

15. The system as recited in claim 12, wherein the output system receives the $m^{th}$ order of diffraction and the detector receives the $-m^{th}$ order of diffraction.

16. The system as recited in claim 15, wherein the light from the illumination source is normal to the diffractive grating modulator.

17. The system as recited in claim 12, wherein the output system captures the $0^{th}$ order and the detector captures a diffracted order.

18. The system as recited in claim 12, wherein the diffractive grating modulator system produces an image with stable intensity.

19. The system as recited in claim 12, wherein the output system is a display.

20. The system as recited in claim 12, wherein the output system is a printer.

* * * * *